United States Patent
Gassoway

(10) Patent No.: US 8,060,867 B2
(45) Date of Patent: Nov. 15, 2011

(54) SYSTEMS AND METHODS FOR EXCLUDING USER SPECIFIED APPLICATIONS

(75) Inventor: Paul Gassoway, Norwood, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1274 days.

(21) Appl. No.: 11/132,610

(22) Filed: May 18, 2005

(65) Prior Publication Data

US 2005/0262576 A1 Nov. 24, 2005

Related U.S. Application Data

(60) Provisional application No. 60/572,984, filed on May 20, 2004.

(51) Int. Cl.
*G06F 9/44* (2006.01)
(52) U.S. Cl. .................................................. 717/140
(58) Field of Classification Search .................. 717/140
See application file for complete search history.

(56) References Cited

U.S. PATENT DOCUMENTS

| 6,092,194 | A | 7/2000 | Touboul .......................... 713/200 |
| 6,694,434 | B1* | 2/2004 | McGee et al. ................. 713/189 |
| 2003/0041198 | A1 | 2/2003 | Exton et al. .................... 710/200 |
| 2004/0078565 | A1* | 4/2004 | Hofmeister et al. .......... 713/156 |
| 2005/0021971 | A1* | 1/2005 | Patankar et al. .............. 713/176 |
| 2007/0260880 | A1* | 11/2007 | Satterlee et al. .............. 713/164 |
| 2009/0013374 | A1* | 1/2009 | Tsai .................................. 726/1 |

FOREIGN PATENT DOCUMENTS

| EP | 0 697 662 A1 | 2/1996 |
| WO | WO 00/72149 A1 | 11/2000 |

* cited by examiner

*Primary Examiner* — Philip Wang
(74) *Attorney, Agent, or Firm* — Baker Botts L.L.P.

(57) ABSTRACT

A method for blocking the execution of prohibited files, includes requesting execution of a file to be executed, identifying the file to be executed, comparing the identified file to be executed to a list of files that are prohibited and executing the identified file to be executed when the identified file to be executed does not match a file listed in the list of files that are prohibited.

40 Claims, 4 Drawing Sheets

SYSTEMS AND METHODS FOR EXCLUDING USER SPECIFIED APPLICATIONS

REFERENCE TO RELATED APPLICATION

The present disclosure is based on and claims the benefit of Provisional Application Ser. No. 60/572,984 filed May 20, 2004, the entire contents of which are herein incorporated by reference.

BACKGROUND

1. Technical Field

The present disclosure relates to security and, more specifically, to systems and methods for excluding user specified applications.

2. Description of the Related Art

In today's highly computer dependant environment, computer security is a major concern. The security of computers is routinely threatened by computer viruses, Trojan horses, worms and the like. Once computers are infected with these malicious programs, the malicious programs may have the ability to damage expensive computer hardware, destroy valuable data, tie up limited computing resources or compromise the security of sensitive information.

Malicious programs are not the only threat to the security and efficiency of computer systems. Many programs that are not malicious in their intent have the ability to threaten computer security, expose businesses to legal risks, allow computer users to otherwise waste or misuse businesses' computer resources, or create additional maintenance burdens on businesses' limited information technology support personnel.

To guard against the risk of malicious programs, businesses will often employ antivirus programs. Antivirus programs are computer programs that can scan computer systems to detect malicious computer code embedded within infected computer files. Malicious code can then be removed from infected files, the infected files may be quarantined or the infected file may be deleted from the computer system.

Businesses may also employ policies to attempt to prevent employees from exposing the business and the business computers they use to security risks, legal liability and improper use. These businesses may implement policies prohibiting the use of certain computer programs such as software for the remote control of computers, computer games, file sharing software and internet chat programs, etc.

In addition to implementing computer use policies, businesses may also seek to enforce these policies by either preventing the execution of prohibited files or reporting the use of these programs to the computer network administrator.

Many businesses prevent the execution of prohibited files by denying individual users the privilege of installing any programs on the computers they use. This method can be circumvented by programs that do not require formal installation prior to execution. This method also creates additional burdens on network administrators and information technology support personnel who must be directly involved in all program installations.

SUMMARY

A method for blocking the execution of prohibited files, comprises requesting execution of a file to be executed, identifying the file to be executed, comparing the identified file to be executed to a list of files that are prohibited and executing the identified file to be executed when the identified file to be executed does not match a file listed in the list of files that are prohibited.

A method for blocking the execution of prohibited files, comprises requesting the execution of a file to be executed, identifying the file to be executed, comparing the identified file to be executed to a list of files that are allowed and executing the identified file to be executed when the identified file to be executed matches a file in the list of files that are allowed.

A system for blocking the execution of prohibited files comprises a requesting unit for requesting the execution of a file to be executed, an identifying unit for identifying the file to be executed, a comparing unit for comparing the identified file to be executed to a list of files that are prohibited and an executing unit for executing the identified file to be executed when the identified file to be executed does not match a file listed in the list of files that are prohibited.

A system for blocking the execution of prohibited files comprises a requesting unit for requesting the execution of a file to be executed, an identifying unit for identifying the file to be executed, a comparing unit for comparing the identified file to be executed to a list of files that are allowed and an executing unit for executing the identified file to be executed when the identified file to be executed matches a file in the list of files that are allowed.

A computer system comprises a processor and a computer recording medium including computer executable code executable by the processor for blocking the execution of prohibited files when requesting execution of a file to be executed. The computer executable code comprises code for identifying the file to be executed, code for comparing the identified file to be executed to a list of files that are prohibited and code for allowing the identified file to be executed when the identified file to be executed does not match a file in the list of files that are prohibited.

A computer system comprises a processor and a computer recording medium including computer executable code executable by the processor for blocking the execution of prohibited files when requesting execution of a file to be executed. The computer executable code comprises code for identifying the file to be executed, code for comparing the identified file to be executed to a list of files that are allowed and code for allowing the identified file to be executed when the identified file to be executed matches a file in the list of files that are allowed.

A computer recording medium including computer executable code executable by the processor for blocking the execution of prohibited files when requesting execution of a file to be executed, the computer executable code comprising code for identifying the file to be executed, code for comparing the identified file to be executed to a list of files that are prohibited and code for allowing the identified file to be executed when the identified file to be executed does not match a file listed in the list of files that are prohibited.

A computer recording medium including computer executable code executable by the processor for blocking the execution of prohibited files when requesting execution of a file to be executed, the computer executable code comprising code for identifying the file to be executed, code for comparing the identified file to be executed to a list of files that are allowed and code for allowing the identified file to be executed when the identified file to be executed matches a file listed in the list of files that are allowed.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
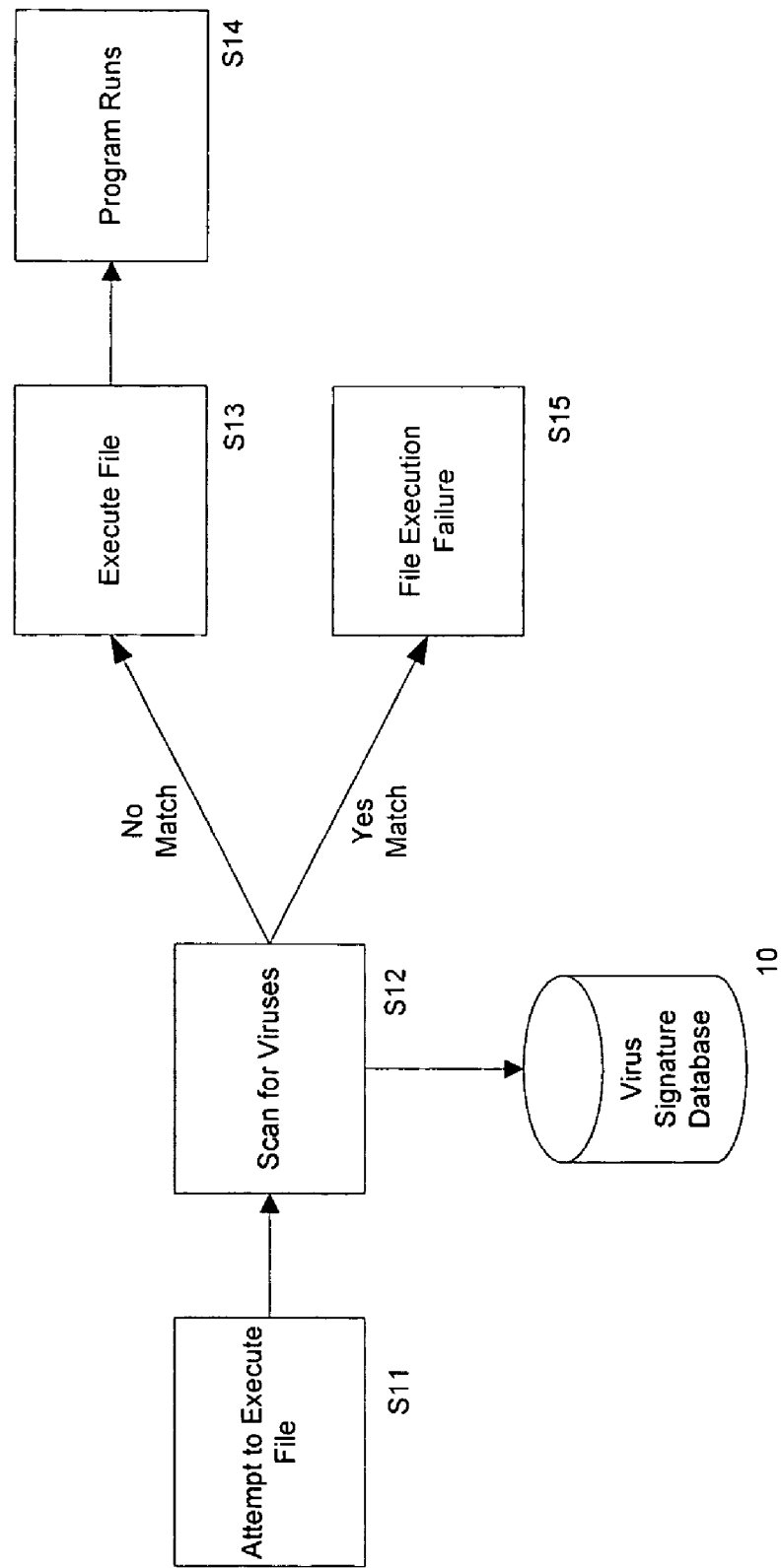
FIG. 1 shows a high-level view of a method for blocking the execution of infected files.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Computer systems are used by businesses to manage information and enhance productivity of employees. Computer systems include, but are not limited to, desktop personal computers, portable personal computers, computer network servers, computer workstations, handheld computers and personal digital assistants (PDAs), and the network hardware used for connecting various computer system elements together.

Computer software is computer code that is designed to be run on computer systems. Computer software can be made up of multiple computer files. Some of these files can be executed by the computer (executable files) and other files are called upon by the executable files.

Malicious software is computer code that can infect files or create new files on a computer system that are capable of doing one or more of the following: deleting files, corrupting files, damaging hardware, self propagating, tying up computer system resources, allowing for unauthorized access of computer systems or commandeering computer system resources for a variety of malicious purposes. Malicious software is generally found in the form of a Trojan horse, worm or viruses but other forms of malicious software exist.

Applications are computer programs that can be used to perform a predefined task, many of which assist businesses with the management of information and enhancement of employee productivity. Examples of applications include Microsoft Word™ and Microsoft Powerpoint™. Computer games are computer programs that have recreational or entertainment value but generally do not assist employees in advancing the interests of the business.

Instant messaging programs are applications that allow users to communicate via text messages in real time. Instant messaging programs can be used to either to enhance the efficiency of business related communications or promote the wasting of time on non-business related communications. Some examples of instant messaging programs are MSN Messenger™, AOL Instant Messenger™ and Yahoo! Messenger™.

File sharing programs are applications that facilitate the copying of programs among multiple users. Use of these applications can lead to unauthorized access of computer system assets thereby compromising computer system security. File sharing programs can also be used to promote the exchange of copyright protected media files such as music and movies. Such use can expose the business to legal liability for copyright infringement. Some examples of file sharing programs include Kazaa™ and Morpheus™.

To protect against malicious software, many businesses use antivirus applications. Antivirus applications attempt to prevent the inadvertent execution of malicious software by checking programs that the user requests execution of against a database of known virus signatures. If the executable file is found to match a known virus signature, that file may be denied execution, erased, quarantined or repaired.

FIG. 1 shows a high-level view of a method for blocking the execution of infected files. This system represents one of the ways in which antivirus applications function. The antivirus application is generally executed when computers startup. The application will then stay resident in the computer's memory until a user attempts to execute a file S11 or continue to run in the background as the computer continues to function, becoming active when a user attempts to execute a file S11. When a user attempts to execute a file S11, the antivirus program activates and scans the file for viruses S12. In this step, the file is analyzed and compared to a database of known virus signatures 10. If one of the virus signatures matches a part of the scanned file, the antivirus program prevents the file from being executed and the execution fails S15. If none of the virus signatures match the parts of the scanned file, the file is executed S13. Once the file is executed, the program associated with the file will run S14.

Businesses may also wish to prevent employees from using computer systems in improper ways. There are many potential uses for computers and not all potential uses advance business interests. Misuse may involve helping employees to waste time such as through the use of computer games. Misuse may also involve employees installing programs that inadvertently create a risk to computer system security. For example, employees may install a remote access program for the purposes of allowing that employee to gain access to his or her work computer from home. Such programs may inadvertently open a hole in the computer system's defenses and this hole may be potentially exploited by unauthorized users. Misuse may also involve the execution of file sharing programs.

Some programs, such as instant messaging programs, have potential for both proper use and misuse. For this reason, businesses may wish to establish policies for acceptable use of business computer systems. Such policies can establish which types of programs are approved for business use and which programs are prohibited. By establishing such policies, businesses can more easily guard against misuse of business computer systems.

In order to enforce business policies for the acceptable use of business computer systems, businesses can employ a computer program to block the execution of unauthorized, banned or otherwise prohibited computer programs. Because it is common for businesses to use antivirus programs, one embodiment of the current disclosure adds to an antivirus program the ability to block the execution of prohibited files.

Figure 2:
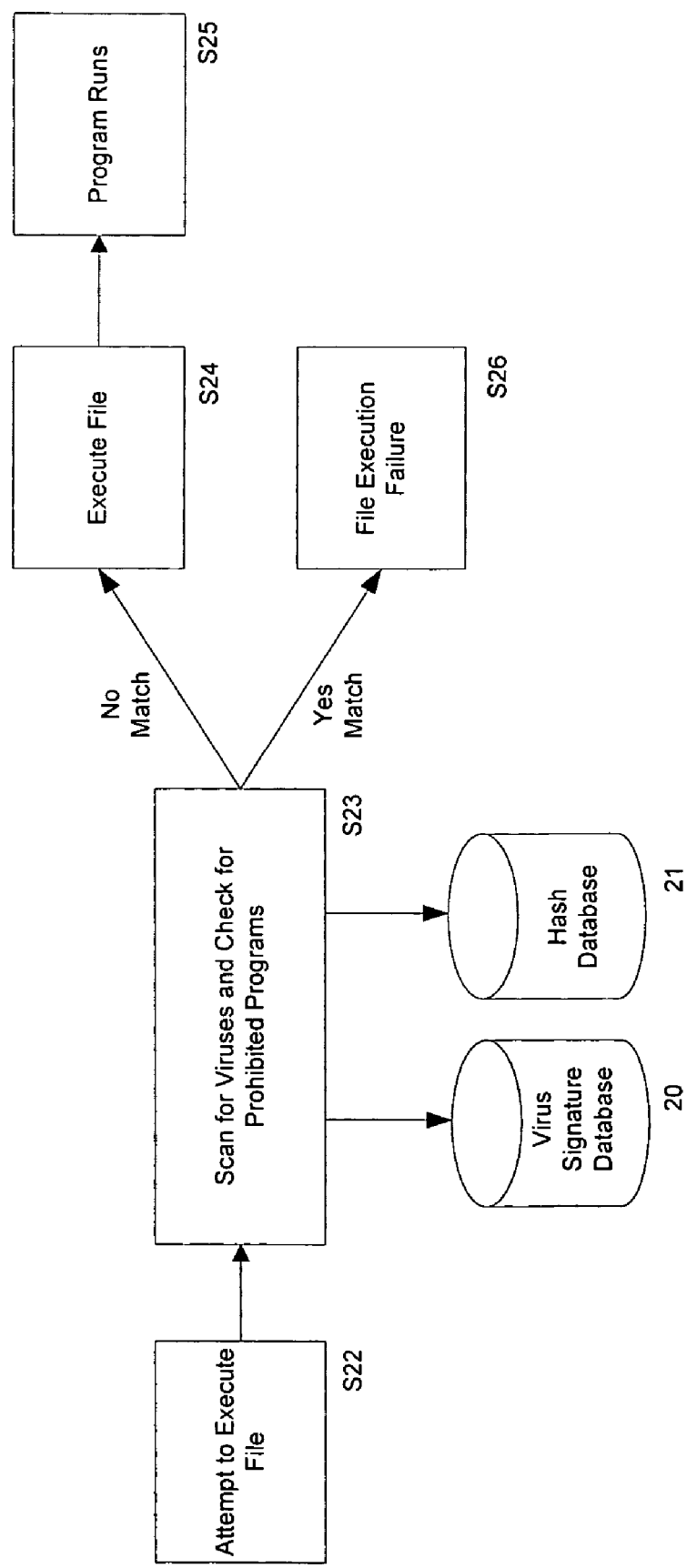
FIG. 2 shows a high-level view of a method for blocking the execution of infected and prohibited files.

FIG. 2 shows a high-level view of a method for blocking the execution of infected and prohibited files according to one embodiment of the current disclosure. According to one embodiment of the current disclosure, this method is implemented through the use of a file scanner. This file scanner is generally a computer program which is executed at computer startup and runs in the background until a request to execute a file is made. Alternatively, the program can be executed each time it is needed and terminate after each use.

When a user attempts to execute a file S22, the execution is temporarily suspended. The file scanner then scans the file that the user has requested execution of S23. The file is analyzed and compared with a database of known virus signatures 20. This database of known virus signatures 20 is periodically updated to include new virus signatures as they are discovered. A hash value for the file is calculated. A hash value is a very large number that can be used to identify a file. The hash value is determined by performing a mathematical algorithm on at least a portion of the data that makes up the file in question. There are many algorithms for calculating a file's hash value that are known in the art. Among these are the MD5 and SHA algorithms. While there are theoretically many different possible files that can all produce the same hash value, the chances of two different files having the same hash value are infinitesimal. The hash value of a file is not affected by changing the file's attributes such as renaming the file, changing the file's creation date and/or changing the file's size. For these reasons, the use of hash values is well suited for file identification. The hash value of the file is compared against a database of hash values that have been calculated for each program whose use has been prohibited 21. This database of hash values 21 is more generally a database of file identifiers. If the file matches either a virus signature from the virus signature database 20 or a hash value from the hash database 21 then the scanning program prevents the file from being executed S26. Other actions may then be taken depending on the nature of the match. For example, if a virus signature has matched, the file may be repaired, quarantined or deleted. Additionally, if a hash value has matched, the network administrator may be notified of the attempt, for example, by email. If no matches have occurred, the scanner will allow the file execution to resume S24 and the program associated with the file will run S25.

According to another embodiment of the current disclosure, when the hash value of the file to be executed matches a hash value within the hash database 21, the file scanner might generate a notification and send the notification, for example, by email, to the network administrator or some other person with computer system oversight responsibility. According to this embodiment, after the file scan S23 has completed, the file to be executed is executed S24 regardless of whether the hash value of the file to be executed matches a hash value within the hash value database 21.

The current disclosure is not limited to embodiments that are capable of both hash matching and virus signature matching. According to another embodiment of the current disclosure, the file scanner only checks to see if the hash value of the file to be executed matches a hash value within the hash database 21. In this embodiment of the current disclosure, no antivirus protection is offered.

Figure 3:
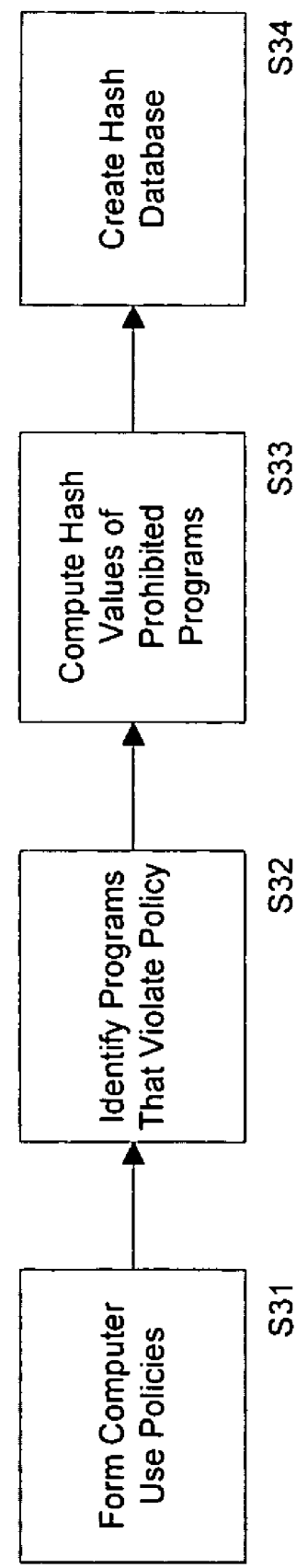
FIG. 3 shows a high-level view of a method for forming a hash database.

FIG. 3 shows a high-level view of a method for forming a hash database according to the present disclosure. The business forms policies for the proper use of computer systems S31. This may be accomplished through the use of published policy statements, or it may be accomplished through informal means. The business uses the formed policies to identify all programs that are specifically prohibited S32. Programs will be specifically prohibited if their execution would violate the formed policies. The hash value is calculated or otherwise ascertained by research for each file that has been specifically prohibited. These hash values are added to a hash database (FIG. 2, 21) S34.

According to another embodiment of the current disclosure, the business uses the formed policies to identify all programs that are specifically allowed. The hash value is calculated or otherwise ascertained by research for each file that has been specifically allowed. These hash values are added to the hash database 21. The hash database 21 can be periodically updated to reflect changes made to the formed policies. According to this embodiment, when the file to be executed is scanned S23, the file to be executed will not be executed S26 when the hash value of the file to be executed does not match a hash value in the hash database 21 and the file to be executed will be executed S24 when the hash value of the file to be executed matches a hash value in the hash database 21.

File identification using hash values may be utilized to implement embodiments of the present current disclosure. There are other methods by which the current disclosure can detect a match between files to be executed and the database of file identifiers. Other algorithms may be used to ascertain an identifying value for the files to be executed and the files to be listed in the database of file identifiers. File attributes may also be used to identify files. File attributes include, but are not limited to, file names, dates associated with the file's creation or modification and file sizes. These file attributes may also be able to identify a class of files, such as all executable files, or all files greater than a certain size. This can be useful, for example, where a business wishes to prevent the execution of ".EXE" type files.

File identification can also be implemented by a bit-by-bit comparison between the file to be executed and the files to be listed in the database of file identifiers. A bit-by-bit comparison is where the first bit of data of the file to be executed is compared to the first bit of data of the first file listed in the database of file identifiers, the second bit of data of the file to be executed is compared to the second bit of data of the first file listed in the database of file identifiers, and so on, until the last bit of data of the file to be executed is compared to the corresponding bit of the first file to be listed in the database of file identifiers, if such a corresponding bit exists. A match occurs when each bit of the file to be executed matches each bit of the first file to be listed in the database of file identifiers in exactly the same order. After the file to be executed has been compared bit-by-bit to the first file to be listed, if no match has been found the file to be executed is compared bit-by-bit to the next file to be listed, and so on, until either a match has been found or the file to be executed is compared bit-by-bit to the last file to be listed without producing a match.

According to another embodiment of the current disclosure, prohibited files can be identified before execution is attempted by systematically checking every file on the computer system. This embodiment preferably coincides with an antivirus system scan, a systematic checking of every file on the computer system for possible infection by a malicious program.

Figure 4:
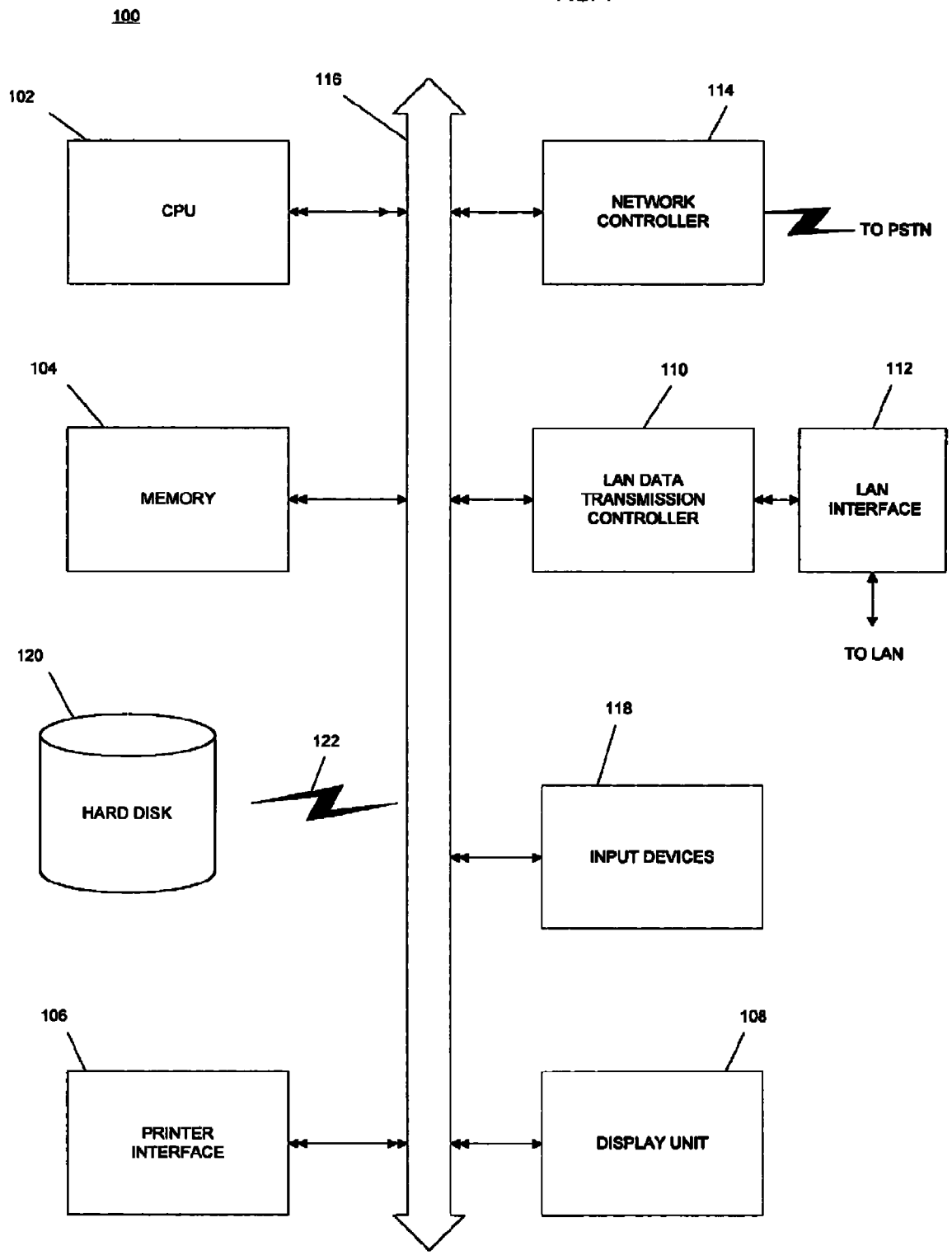
FIG. 4 illustrates an example of a computer system capable of implementing the method and apparatus of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 100 may include, for example, a central processing unit (CPU) 102, random access memory (RAM) 104, a printer interface 106, a display unit 108, a local area network (LAN) data transmission controller 110, a LAN interface 112, a network controller 114, an internal buss 116, and one or more input devices 118, for example, a keyboard, mouse etc. As shown, the system 100 may be connected to a data storage device, for example, a hard disk, 120 via a link 122.

Numerous additional modifications and variations of the present disclosure are possible in view of the above teachings. It is therefore to be understood that within the scope of the appended claims, the present disclosure may be practiced other than as specifically described herein.

What is claimed is:

1. A computer-implemented method for blocking the execution of prohibited files, comprising:
   identifying a file to be executed according to one or more file identifiers, wherein at least one of the file identifiers comprises a file attribute indicating a class of files to which the file to be executed belongs;
   comparing, using a central processing unit, the identified file to be executed to a list of malicious file identifiers and a list of prohibited file identifiers, the list of prohibited file identifiers indicating one or more prohibited classes of files; and
   determining an action to perform based on whether the identified file to be executed corresponds to the list of malicious file identifiers or to the list of prohibited file identifiers, the action comprising blocking the execution of the identified file to be executed when the identified file to be executed belongs to one or more of the prohibited classes of files according to the list of prohibited file identifiers.

2. The method for blocking the execution of prohibited files according to claim 1, wherein:
   identifying the file to be executed comprises ascertaining a hash value of the file to be executed;
   the list of prohibited file identifiers comprises a database of ascertained hash values of the files that are prohibited; and
   comparing the identified file to be executed comprises comparing the hash value ascertained of the file to be executed to the database of ascertained hash values of the files that are prohibited.

3. The method for blocking the execution of prohibited files according to claim 1, wherein:
   comparing the identified file to be executed further comprises comparing the identified file to be executed to a database of known virus signatures; and
   executing the identified file to be executed comprises executing the identified file to be executed when the identified file to be executed does not match a file in the list of prohibited file identifiers and the file to be executed does not match a known virus signature in the database of known virus signatures.

4. The method for blocking the execution of prohibited files according to claim 1, wherein:
   identifying the file to be executed comprises ascertaining one or more file attributes of the file to be executed;
   the list of prohibited file identifiers comprises a database of one or more file attributes of files that are prohibited; and
   comparing the identified file to be executed comprises comparing the one or more file attributes ascertained of the file to be executed to the database of one or more file attributes of files that are prohibited.

5. The method for blocking the execution of prohibited files according to claim 1, wherein comparing the identified file to be executed comprises comparing the file to be executed to the files that are prohibited bit-by-bit.

6. A computer-implemented method for blocking the execution of prohibited files, comprising:
   identifying a file to be executed according to one or more file identifiers, wherein at least one of the file identifiers comprises a file attribute indicating a class of files to which the file to be executed belongs;
   comparing, using a central processing unit, the identified file to be executed to a list of malicious file identifiers and a list of allowed file identifiers, the list of allowed file identifiers indicating one or more allowed classes of files;
   determining an action to perform based on whether the identified file to be executed corresponds to the list of malicious file identifiers or fails to correspond to the list of allowed file identifiers, the action comprising blocking the execution of the identified file to be executed when the identified file to be executed belongs to a prohibited class, the prohibited class not on the list of allowed classes of files according to the list of allowed file identifiers.

7. The method for blocking the execution of prohibited files according to claim 6, wherein:
   identifying the file to be executed comprises ascertaining a hash value of the file to be executed;
   the list of allowed file identifiers comprises a database of ascertained hash values of the files that are allowed; and
   comparing the identified file to be executed comprises comparing the hash value ascertained of the file to be executed to the database of ascertained hash values of the files that are allowed.

8. The method for blocking the execution of prohibited files according to claim 6, wherein:
   comparing the identified files to be executed further comprises comparing the identified file to be executed to a database of known virus signatures; and
   executing the identified file to be executed comprises executing the identified file to be executed when the identified file to be executed matches a file in the list of allowed file identifiers and the file to be executed does not match a known virus signature in the database of known virus signatures.

9. The method for blocking the execution of prohibited files according to claim 6, wherein:
   identifying the files to be executed comprises ascertaining one or more file attributes of the file to be executed;
   the list of allowed file identifiers comprises a database of one or more file attributes of files that are allowed; and
   comparing the identified file to be executed comprises comparing the one or more file attributes ascertained of the file to be executed to the database of one or more file attributes of files that are allowed.

10. The method for blocking the execution of prohibited files according to claim 6, wherein comparing the identified file to be executed comprises comparing the file to be executed to the files that are allowed bit-by-bit.

11. A system including memory and one or more processors and configured to block the execution of prohibited files comprising:
    an identifying unit for identifying a file to be executed according to one or more file identifiers, wherein at least one of the file identifiers comprises a file attribute indicating a class of files to which the file to be executed belongs;
    a comparing unit for comparing the identified file to be executed to a list of malicious file identifiers and a list of prohibited file identifiers, the list of prohibited file identifiers indicating one or more prohibited classes of files; and
    an executing unit for determining an action to perform based on whether the identified file to be executed corresponds to the list of malicious file identifiers or to the list of prohibited file identifiers, the action comprising blocking the execution of the identified file to be executed when the identified file to be executed belongs to one or more of the prohibited classes of files according to the list of prohibited file identifiers.

12. The system for blocking the execution of prohibited files according to claim 11, wherein:
the identifying unit ascertains a hash value of the file to be executed;
the list of prohibited file identifiers comprises a database of ascertained hash values of files that are prohibited; and
the comparing unit compares the hash value ascertained of the file to be executed to the database of ascertained hash values of the files that are prohibited.

13. The system for blocking the execution of prohibited files according to claim 11 wherein:
the comparing unit further compares the identified file to be executed to a database of known virus signatures; and
the executing unit executes the identified file to be executed when the identified file to be executed does not match a file in the list of prohibited file identifiers and the file to be executed does not match a known virus signature in the database of known virus signatures.

14. The system for blocking the execution of prohibited files according to claim 11, wherein:
the identifying unit ascertains one or more file attributes of the file to be executed;
the list of prohibited file identifiers comprises a database of one or more file attributes of files that are prohibited; and
the comparing unit compares the one or more file attributes ascertained of the file to be executed to the database of one or more file attributes of files that are prohibited.

15. The system for blocking the execution of prohibited files according to claim 11, wherein the comparing unit compares the file to be executed to the files that are prohibited bit-by-bit.

16. A system including memory and one or more processors for blocking the execution of prohibited files comprising:
an identifying unit for identifying a file to be executed according to one or more file identifiers, wherein at least one of the file identifiers comprises a file attribute indicating a class of files to which the file to be executed belongs;
a comparing unit for comparing the identified file to be executed to a list of malicious file identifiers and a list of allowed file identifiers, the list of allowed file identifiers indicating one or more allowed classes of files;
an executing unit for determining an action to perform based on whether the identified file to be executed corresponds to the list of malicious file identifiers or fails to correspond to the list of allowed file identifiers, the action comprising blocking the execution of the identified file to be executed when the identified file to be executed belongs to a prohibited class, the prohibited class not on the list of allowed classes of files according to the list of allowed file identifiers.

17. The system for blocking the execution of prohibited files according to claim 16, wherein:
the identifying unit ascertains a hash value of the file to be executed;
the list of allowed file identifiers comprises a database of ascertained hash values of files that are allowed; and
the comparing unit compares the hash value ascertained of the file to be executed to the database of hash values of the files that are allowed.

18. The system of blocking the execution of prohibited files according to claim 16, wherein:
the comparing unit compares the identified file to be executed to a database of known virus signatures; and
the executing unit executes the identified file to be executed when the identified file to be executed matches a file listed in the list of allowed file identifiers and the file to be executed does not match a known virus signature in the database of known virus signatures.

19. The system for blocking the execution of prohibited files according to claim 16, wherein:
the identifying unit ascertains one or more file attributes of the file to be executed;
the list of allowed file identifiers comprises a database of one or more file attributes of files that are allowed; and
the comparing unit compares the one or more file attributes ascertained of the file to be executed to the database of one or more file attributes of files that are allowed.

20. The system for blocking the execution of prohibited files according to claim 16, wherein the comparing unit compares the file to be executed to the files that are allowed bit-by-bit.

21. A computer system comprising:
a processor; and
a computer recording medium including computer executable code executable by the processor for blocking the execution of prohibited files, the computer executable code comprising:
code for identifying a file to be executed according to one or more file identifiers, wherein at least one of the file identifiers comprises a file attribute indicating a class of files to which the file to be executed belongs;
code for comparing the identified file to be executed to a list of malicious file identifiers and a list of prohibited file identifiers, the list of prohibited file identifiers indicating one or more prohibited classes of files; and
code for determining an action to perform based on whether the identified file to be executed corresponds to the list of malicious file identifiers or to the list of prohibited file identifiers, the action comprising blocking the execution of the identified file to be executed when the identified file to be executed belongs to one or more of the prohibited classes of files according to the list of prohibited file identifiers.

22. The computer system according to claim 21, wherein:
the code for identifying the file to be executed comprises code for ascertaining a hash value of the file to be executed;
the list of prohibited file identifiers comprises a database of ascertained hash values of files that are prohibited; and
the code for comparing the identified file to be executed comprises code for comparing the hash value ascertained of the file to be executed to the database of ascertained hash values of the files that are prohibited.

23. The computer system of claim 21, wherein:
the code for comparing the identified file to be executed further comprises code for comparing the identified file to be executed to a database of known virus signatures; and
the code for executing the identified file to be executed comprises code for executing the identified file to be executed when the identified file to be executed when the identified file to be executed does not match a file in the list of prohibited file identifiers and the file to be executed does not match a known virus signature in the database of known virus signatures.

24. The computer system according to claim 21, wherein:
the code for identifying the file to be executed comprises code for ascertaining one or more file attributes of the file to be executed;

the list of prohibited file identifiers comprises a database of one or more file attributes of files that are prohibited; and the code for comparing the identified file to be executed comprises code for comparing the one or more file attributes ascertained of the file to be executed to the database of one or more file attributes of files that are prohibited.

25. The computer system according to claim 21, wherein the code for comparing the identified file to be executed comprises code for comparing the file to be executed to the files that are prohibited bit-by-bit.

26. The computer system comprising:

a processor; and a computer recording medium including computer executable code executable by the processor for blocking the execution of prohibited files, the computer executable code comprising:

code for identifying a file to be executed according to one or more file identifiers, wherein at least one of the file identifiers comprises a file attribute indicating a class of files to which the file to be executed belongs;

code for comparing the identified file to be executed to a list of malicious file identifiers and a list of allowed file identifiers, the list of allowed file identifiers indicating one or more allowed classes of files;

code for determining an action to perform based on whether the identified file to be executed corresponds to the list of malicious file identifiers or fails to correspond to the list of allowed file identifiers, the action comprising blocking the execution of the identified file to be executed when the identified file to be executed belongs to a prohibited class, the prohibited class not on the list of allowed classes of files according to the list of allowed file identifiers.

27. The computer system according to claim 26, wherein:

the code for identifying the file to be executed comprises code for ascertaining a hash value of the files to be executed;

the list of allowed file identifiers comprises a database of ascertained hash values of the files that are allowed; and the code for comparing the identified file to be executed comprises code for comparing the hash value ascertained of the file to be executed to the database of ascertained hash values of the files that are allowed.

28. The computer system according to claim 26, wherein:

the code for comparing the identified file to be executed further comprises code for comparing the identified file to be executed to a database of known virus signatures; and the code for allowing the identified file to be executed comprises code for allowing the identified file to be executed when the identified file to be executed matches a file in the list of allowed file identifiers and the file to be executed does not match a known virus signature in the database of known virus signatures.

29. The computer system according to claim 26, wherein:

the code for identifying the file to be executed comprises code for ascertaining one or more file attributes of the file to be executed;

the database of allowed files comprises a database of one or more file attributes of files that are allowed; and the code for comparing the identified file to be executed comprises code for comparing the one or more file attributes ascertained of the file to be executed to the database of file attributes of files that are allowed.

30. The computer system according to claim 26, wherein the code for comparing the identified file to be executed comprises code for comparing the file to be executed to the files that are allowed bit-by-bit.

31. A computer recording medium including computer executable code executable by a processor for blocking the execution of prohibited files, the computer executable code comprising:

code for identifying a file to be executed according to one or more file identifiers, wherein at least one of the file identifiers comprises a file attribute indicating a class of files to which the file to be executed belongs;

code for comparing the identified file to be executed to a list of malicious file identifiers and a list of prohibited file identifiers, the list of prohibited file identifiers indicating one or more prohibited classes of files; and code for determining an action to perform based on whether the identified file to be executed corresponds to the list of malicious file identifiers or to the list of prohibited file identifiers, the action comprising blocking the execution of the identified file to be executed when the identified file to be executed belongs to one or more of the prohibited classes of files according to the list of prohibited file identifiers.

32. The computer recording medium according to claim 31, wherein:

the code for identifying the file to be executed comprises code for ascertaining a hash value of the file to be executed;

the list of prohibited file identifiers comprises a database of ascertained hash values of files that are prohibited; and the code for comparing the identified file to be executed comprises code for comparing the hash value ascertained of the file to be executed to the database of ascertained ash values of the files that are prohibited.

33. The computer recording medium according to claim 31, wherein:

the code for comparing the identified file to be executed further comprises code for comparing the identified file to be executed to a database of known virus signatures; and the code for executing the identified file to be executed comprises code for executing the identified file to be executed when the identified file to be executed does not match a file in the list of prohibited file identifiers and the file to be executed does not match a known virus signature in the database of known virus signatures.

34. The computer recording medium according to claim 31, wherein:

the code for identifying the file to be executed comprises code for ascertaining one or more file attributes of the file to be executed;

the list of prohibited file identifiers prohibited comprises a database of one or more file attributes of files that are prohibited; and the code for comparing the identified file to be executed comprises code for comparing the one or more file attributes ascertained of the file to be executed to the database of one or more file attributes of files that are prohibited.

35. The computer recording medium according to claim 31, wherein the code for comparing the identified file to be executed comprises code for comparing the file to be executed to the files that are prohibited bit-by-bit.

36. A computer recording medium including computer executable code executable by a processor for blocking the execution of prohibited files, the computer executable code comprising:

code for identifying a file to be executed according to one or more file identifiers, wherein at least one of the file identifiers comprises a file attribute indicating a class of files to which the file to be executed belongs;

code for comparing the identified file to be executed to a list of malicious file identifiers and a list of allowed file identifiers, the list of allowed file identifiers indicating one or more allowed classes of files;

code for determining an action to perform based on whether the identified file to be executed corresponds to the list of malicious file identifiers or fails to correspond to the list of allowed file identifiers, the action comprising blocking the execution of the identified file to be executed when the identified file to be executed belongs to a prohibited class, the prohibited class not on the list of allowed classes of files according to the list of allowed file identifiers.

37. The computer recording medium according to claim 36, wherein:

the code for identifying the file to be executed comprises code for ascertaining a hash value of the file to be executed;

the list of allowed file identifiers comprises a database of ascertained hash values of the files that are allowed; and the code for comparing the identified file to be executed comprises code for comparing the hash value ascertained of the file to be executed to the database of ascertained hash values of the files that are allowed.

38. The computer recording medium according to claim 36, wherein:

the code for comparing the identified file to be executed further comprises code for comparing the identified file to be executed to a database of known virus signatures; and the code for allowing the identified file to be executed comprises code for allowing the identified file to be executed when the identified file to be executed matches a file in the list of allowed file identifiers and the file to be executed does not match a known virus signature in the database of known virus signatures.

39. The computer recording medium according to claim 36, wherein:

the code for identifying the file to be executed comprises code for ascertaining one or more file attributes of the file to be executed;

the list of allowed file identifiers comprises a database of one or more file attributes of files that are allowed; and the code for comparing the identified file to be executed comprises code for comparing the one or more file attributes ascertained of the file to be executed to the database of one or more file attributes of files that are allowed.

40. The computer recording medium according to claim 36, wherein the code for comparing the identified file to be executed comprises code for comparing the file to be executed to the files that are allowed bit-by-bit.

* * * * *